United States Patent Office 3,576,820
Patented Apr. 27, 1971

3,576,820
METHOD FOR MAKING SMALL-RING CYCLIC SULFIDES
Scott Searles, Jr., 740 Elling Drive, Manhattan, Kans. 66502, and Eugene F. Lutz, Concord, Calif.; said Lutz assignor to said Searles
No Drawing. Continuation-in-part of application Ser. No. 820,575, June 16, 1959. This application May 31, 1963, Ser. No. 284,393
Int. Cl. C07d 59/00
U.S. Cl. 260—327      8 Claims

ABSTRACT OF THE DISCLOSURE

Disclosed is the preparation of small-ring cyclic sulfides by heating a thiocyanate salt with the cyclic carbonate of a diol in which the hydroxyl groups are attached to carbon atoms each having at least one attached hydrogen atom, said carbon atoms being separated from each other by no more than one intervening, hydroxyl-free carbon atom.

---

This application is a continuation-in-part of our application Ser. No. 820,575, filed June 16, 1959, now abandoned.

This invention relates to a new method for making small-ring cyclic sulfides.

Small-ring cyclic sulfides, such as ethylene sulfide, have a wide variety of known and potential uses. Ethylene sulfide has long been used in the mercaptoethylation of organic compounds, producing for example, polyethylene sulfide long side chains hooked onto $NH_2$ or SH groups of proteins and onto the OH groups of cellulose, stabilizing the compounds and producing other desirable results. Ethylene sulfide may also be used to enhance the properties of natural polymer chains by the formation in situ of polyethylene sulfide chains entwined with but not necessarily bonded to the natural polymer chains.

Despite the many possible uses for ethylene sulfide and similar small-ring cyclic sulfides, they have not been used commercially to any appreciable extent, because prior to our invention there has never been a simple, efficient method for their preparation. In the past ethylene sulfide has been prepared by reacting 2-chloroethylmercaptan with sodium bicarbonate or by reactioning ethylene oxide with potassium thiocyanate. In either method the ethylene sulfide has to be fractionated from water, and most of it polymerizes during the process, giving relatively poor yields of the desired monomer.

It is the primary object of the present invention to produce small-ring cyclic sulfides, particularly ethylene sulfide, by a simple, efficient process providing relatively high yields, which will make such sulfides available for wide commercial use.

In accordance with our invention, we heat a thiocyanate salt with the cyclic carbonate of a diol in which the hydroxyl groups are attached to carbon atoms each having at least one attached hydrogen atom, said carbon atoms being separated from each other by no more than one intervening, hydroxyl-free carbon atom, and isolate the small-ring cyclic sulfide reaction product by fractionation, solvent extraction or other suitable method. These cyclic carbonates can be conveniently and easily prepared, by methods well-known in the art, as for example, from a 1,2- or 1,3-diol and ethylene carbonate or diethyl carbonate. Preferably the cyclic carbonate, if not liquid at room temperature, is melted prior to the addition of the thiocyanatee salt and the reactants are present in equimolar amounts. However, the thiocyanate salt may be heated with the cyclic carbonate in solid form so that the carbonate is melted progressively. Alternatively, the two reactants may be dissolved in a suitable organic solvent, preferably one having a boiling point above that of the cyclic sulfide to be produced, to facilitate isolation of the sulfide. Since, as previously noted, the presence of any appreciable amount of water tends to promote polymerization of the cyclic sulfide, particularly ethylene sulfide, the reaction should be carried out substantially in the absence of water.

The thiocyanate salt and cyclic carbonate are heated until substantial reaction is observed and then maintained at approximately that temperature during the remainder of the reaction. The evolution of the by-product, carbon dioxide, is one indication of reaction. The reaction temperature will usually be above the boiling point of the cyclic sulfide produced, enabling the sulfide to be easily isolated by fractionation.

The reaction temperature and yield will vary somewhat depending on the particular thiocyanate salt employed and the molar proportion of such salt to cyclic carbonate. An alkali metal or alkaline earth metal thiocynate salt—such as the thiocyanate salts of potassium, sodium and calcium—is preferred on the basis of cost and availability but other thiocyanate salts may be employed so long as the cation is selected to avoid adverse effects on the reaction. The critical ingredient is thiocyanate ion. As used in this application, the term "alkaline metal thiocyanate salt" means the thiocyanate salt of an alkali metal or an alkaline earth metal.

In general, cyclic carbonates of diols having the following formula are best suited for use in our process:

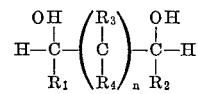

where $R_1$, $R_2$, $R_3$ and $R_4$ each is selected from the group consisting of hydrogen, a halogen, and alkyl radical and an aryl radical, and $n$ equals 0 to 1. The yield of cyclic sulfide tends to be higher when the alkyl or aryl groups, if present, contain six carbon atoms or less. If higher molecular weight radicals are present, they should preferably be attached to the hydroxyl-free carbon atom of the diol, which is less sensitive to substitution.

"Small-ring," as used in this application, is intended to mean a ring of three or four members. The cyclic sulfides produced by our process correspond to the cyclic carbonate reactant, with the sulfur atom in place of the carbonate group.

As illustrative of our invention but not in limitation thereof, the following examples are given. Heating equimolar amounts of potassium thiocyanate with the melted cyclic carbonates listed in the table, we prepared the corresponding small-ring cyclic sulfides, isolating the sulfide by fractionation.

TABLE

| Cyclic carbonate of— | Reaction temp., C. | Product | Yield, percent |
|---|---|---|---|
| A__ Ethylene glycol___ | 95 | Ethylene sulfide_____ | 64.5 |
| B__ 1,3-propanediaol__ | 140 | Trimethylene sulfide__ | 3.4 |
| C__ 1,3-butanediol____ | 170–180 | 2-methylthietane_____ | 15.8 |
| D__ 2,2-dimethyl-1,3-propanediol. | 175–180 | 3,3-dimethylthietane__ | 58.6 |
| E__ 2,2-diethyl-1,3-propanediol. | 190–195 | 3,3-diethylthietane____ | 43.8 |

Having described our invention, we claim:
1. A method for making cyclic mono-sulfides which comprises heating an alkaline metal thiocyanate salt with the cyclic carbonate of a diol having the formula:

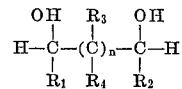

where $R_1$, $R_2$, $R_3$ and $R_4$ each is selected from the group consisting of hydrogen, halogen, alkyl of less than seven carbon atoms, and aryl of less than seven carbon atoms, and $n$ is a digit less than 2, said method being carried out substantially in the absence of water.

2. A method according to claim 1 in which the diol is ethylene glycol.

3. A method according to claim 1 in which the diol is 1,3-propanediol.

4. A method according to claim 1 in which the diol is 1,3-butanediol.

5. A method according to claim 1 in which the diol is 2,2-dimethyl-1,3-propanediol.

6. A method according to claim 1 in which the diol is 2,2-diethyl-1,3-propanediol.

7. A method according to claim 1 in which the thiocyanate salt is an alkali metal thiocyanate salt.

8. A method of preparing ethylene sulfide which comprises heating potassium thiocyanate with an equimolar amount of liquid cyclic carbonate of ethylene glycol at a temperature of approximately 95 degrees C., and isolating the ethylene sulfide thereby produced, said method being carried out substantially in the absence of water.

References Cited

UNITED STATES PATENTS 3,148,197   9/1964   Vannel _____ 260—327

OTHER REFERENCES

Searles et al., Jour. Amer. Chem. Soc., vol. 80, June 20, 1958, p. 3168, QD1, A5.

JAMES A. PATTEN, Primary Examiner